(12) United States Patent
Delle et al.

(10) Patent No.: US 9,451,870 B2
(45) Date of Patent: Sep. 27, 2016

(54) DISHWASHER WITH SORPTION DRYER DEVICE

(75) Inventors: Daniel Delle, Bächingen (DE); Ulrich Ferber, Holzheim (DE); Helmut Jerg, Giengen (DE); Hans-Peter Nannt, Gerstetten (DE); Kai Paintner, Adelsried (DE)

(73) Assignee: BSH Hausgeräte GmbH, Munich (DE)

( * ) Notice: Subject to any disclaimer, the term of this patent is extended or adjusted under 35 U.S.C. 154(b) by 909 days.

(21) Appl. No.: 13/055,188

(22) PCT Filed: Jul. 24, 2009

(86) PCT No.: PCT/EP2009/059569
§ 371 (c)(1),
(2), (4) Date: Jan. 21, 2011

(87) PCT Pub. No.: WO2010/012659
PCT Pub. Date: Feb. 4, 2010

(65) Prior Publication Data
US 2011/0120512 A1    May 26, 2011

(30) Foreign Application Priority Data

Jul. 28, 2008   (DE) .................. 10 2008 040 789

(51) Int. Cl.
*A47L 15/42* (2006.01)
*A47L 15/48* (2006.01)

(52) U.S. Cl.
CPC .......... *A47L 15/481* (2013.01); *A47L 15/4291* (2013.01); *Y02B 40/44* (2013.01)

(58) Field of Classification Search
CPC ............... A47L 15/481; A47L 15/486; A47L 2501/10; A47L 15/0042; A47L 2501/12; A47L 9/0081
USPC .. 134/56 D, 57 D, 58 D, 105, 107, 18, 25.1; 138/44, 40, 42
See application file for complete search history.

(56) References Cited

U.S. PATENT DOCUMENTS 2,288,917 A * 7/1942 Norris .......................... 416/235
3,784,786 A * 1/1974 Calvert, Sr. .................. 392/485
(Continued)

FOREIGN PATENT DOCUMENTS

CN          1895153 A    1/2007
DE         10353774 A1   2/2005
(Continued)

OTHER PUBLICATIONS

English Machine Translation of Specification of JPH08224201 (Noritake et al. 1996).*
(Continued)

*Primary Examiner* — David Cormier
*Assistant Examiner* — Irina Graf
(74) *Attorney, Agent, or Firm* — Michael Tschupp; Andre Pallapies

(57) ABSTRACT

A dishwasher having a washing container, a sorption dryer device connected to the washing container in an air-conducting fashion, and at least one flow-conditioning device to homogenize a flow cross-section profile of an airflow as the airflow flows through the sorption dryer device. The flow-conditioning device is provided for the sorption unit between at least one heating element and the sorption unit of the sorption dryer device when viewed in the direction of the airflow such that essentially every point of an intake cross-section area of the sorption unit of the sorption dryer device is permeated by a volumetric airflow with essentially the same intake temperature.

49 Claims, 5 Drawing Sheets

(56) References Cited

U.S. PATENT DOCUMENTS

| | | | |
|---|---|---|---|
| 4,108,953 A * | 8/1978 | Rocco | 261/142 |
| 5,341,848 A | 8/1994 | Laws | |
| 5,443,420 A | 8/1995 | Kim et al. | |
| 5,529,093 A * | 6/1996 | Gallagher et al. | 138/44 |
| 7,585,373 B2 | 9/2009 | Jerg et al. | |
| 2001/0042383 A1* | 11/2001 | Chiang et al. | 62/246 |
| 2006/0278257 A1* | 12/2006 | Jerg et al. | 134/56 D |
| 2007/0089763 A1* | 4/2007 | Paintner | 134/56 D |
| 2007/0157954 A1* | 7/2007 | Classen et al. | 134/56 D |
| 2007/0295360 A1* | 12/2007 | Jerg et al. | 134/10 |
| 2007/0295373 A1* | 12/2007 | Jerg et al. | 134/105 |
| 2008/0295875 A1 | 12/2008 | Jerg et al. | |

FOREIGN PATENT DOCUMENTS

| | | | | |
|---|---|---|---|---|
| DE | 10353775 A1 | | 2/2005 | |
| JP | H08224201 | * | 9/1996 | A47L 15/42 |

OTHER PUBLICATIONS

National Search Report CN 2009801294993.
Granting Decision RU 2011105766 dated Oct. 21, 2013.

* cited by examiner

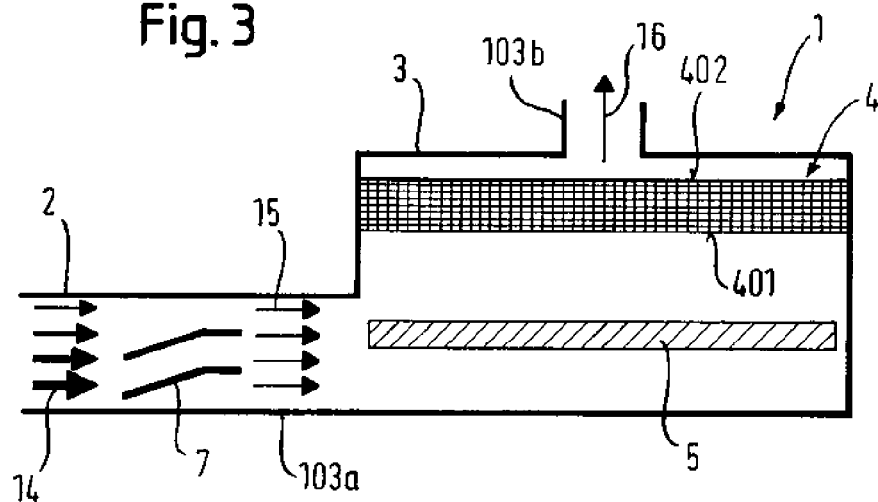
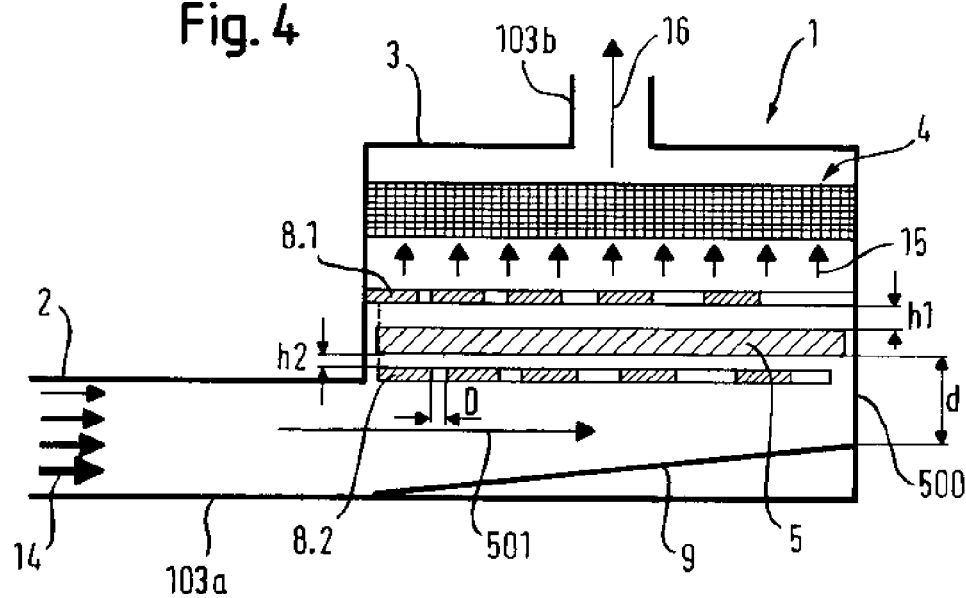

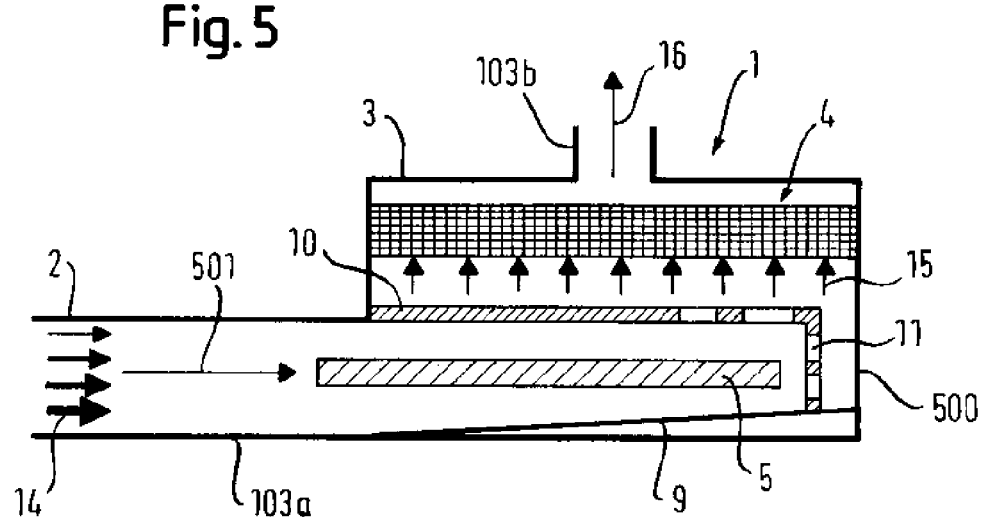
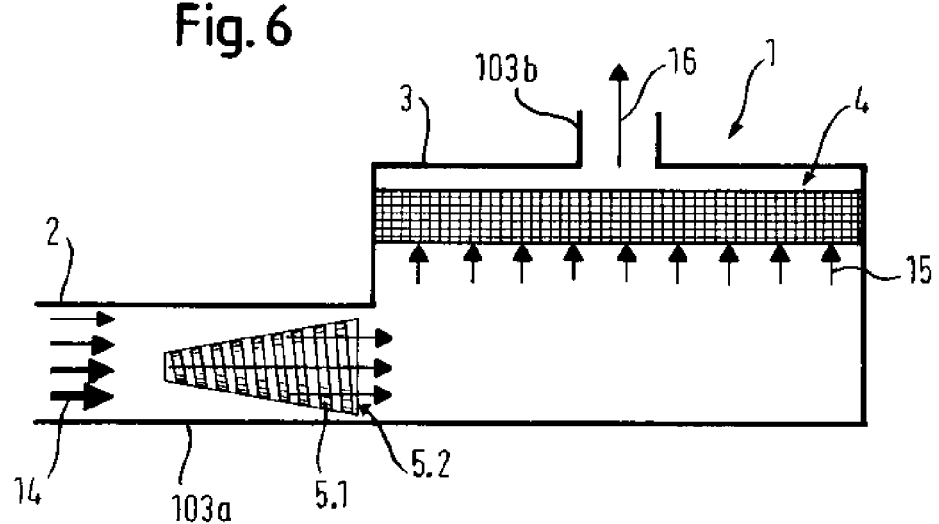

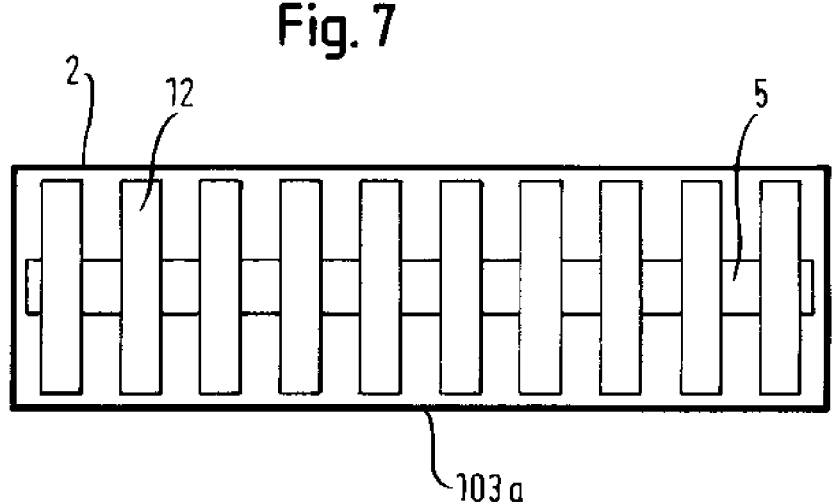
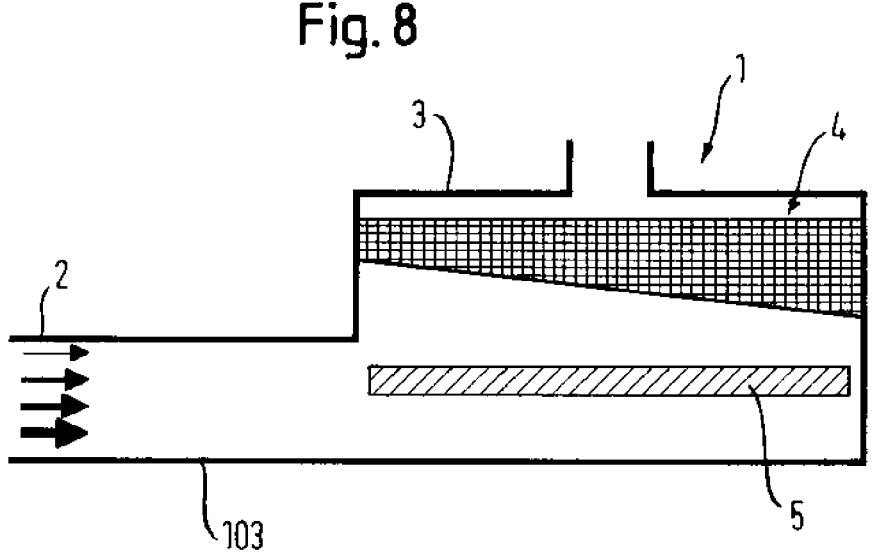

DISHWASHER WITH SORPTION DRYER DEVICE

BACKGROUND OF THE INVENTION

The present invention relates to a dishwasher with a washing container and a sorption dryer device, which is connected in an air-conducting fashion to the washing container for the purpose of the through-flow of an airflow.

For example, dishwashers with a so-called sorption column for drying crockery are known from DE 103 53 774 A1, DE 103 53 775 A1, and DE 10 2005 004 096 A1. In this respect, in the "Dry" sub-program step of the respective dishwasher program of the dishwasher for the purpose of drying crockery, moist air from the washing container of the dishwasher is conducted through the sorption column by using a blower, and moisture is drawn from the air that is routed through, by means of condensation, by its reversibly dehydratable drying material. For the regeneration, i.e. desorption, of the sorption column, its reversibly dehydratable drying material is heated to very high temperatures. As a result, water stored in this material emerges as hot water vapor and is conducted into the washing container by means of an airflow generated by using the blower. This means that a washing liquor and/or crockery located in the washing container and also the air located in the washing container can be warmed. A sorption column of this type has proved to be very advantageous for energy-saving and gentle drying of the crockery. A heating mechanism is arranged before the air inlet for the sorption column in the direction of flow of the air in DE 10 2005 004 096 A1, for example, for the prevention of local overheating of the drying material during the desorption operation. In spite of this "air heating" during desorption, it is still difficult in practice to dry the reversibly dehydratable drying material adequately and satisfactorily in all cases.

BRIEF SUMMARY OF THE INVENTION

The object underlying the invention is to achieve a more improved sorption and/or desorption result for the reversibly dehydratable drying material of the sorption unit of a sorption dryer device. This object is accomplished in a dishwasher of the type referred to in the introduction by the fact that one or more flow-conditioning means are provided for homogenizing the flow cross-section profile of the airflow as it flows through the sorption dryer device.

Due to the said at least one flow-conditioning means, the airflow can take on an essentially more balanced, and in particular more equally distributed, flow characteristic in particular in terms of flow velocity and/or flow temperature when viewed across its flow cross-section profile, in a targeted, i.e. controlled, manner, so that an improved sorption and/or desorption result of the sorption dryer device is rendered possible with improved energy efficiency at the same time.

The homogenization of the flow cross-section profile of the airflow firstly ensures a more improved even drying of the reversibly dehydratable drying and/or sorption material of the sorption unit of the sorption dryer device when viewed across its through-flow cross-section area in an advantageous manner, in particular during the desorption operation. This is accompanied by an enhanced energy efficiency of the dishwasher. At the same time, local overheating of the drying material is largely prevented. Secondly, the homogenization of the flow cross-section profile of the airflow conversely naturally also increases the sorption performance of the sorption unit compared with unconditioned flow conditions in an advantageous manner, in particular before and/or while flowing through the sorption dryer device. It becomes possible in particular, by means of homogenization of the flow conditions through the sorption dryer device by using the flow-conditioning means, to achieve a predefined desired minimum desorption performance and/or minimum adsorption performance of the sorption dryer device for a large number of practical circumstances in a defined, i.e. controlled, manner in all cases.

Viewed in general terms, in accordance with an expedient development of the invention, the said one or more flow-conditioning means are provided expediently, when viewed in the direction of flow, before the output of the airflow from the sorption unit of the sorption dryer device, and in particular preferably even before the intake for the airflow into the sorption unit of the sorption dryer device, in order to be able to make the airflow before and/or during its passage through the sorption material in the container of the sorption unit largely identical at every point of every through-flow cross-section area of the container volume of the sorption unit in terms of its flow characteristics. In particular, the said one or more flow-conditioning means are realized in such a way that the individual flow components of the conditioned airflow can be largely approximated to each other in terms of one or more flow parameters of their flow characteristics, such as flow velocity and or temperature for example.

In accordance with an expedient development, the sorption dryer device has at least one sorption unit with reversibly dehydratable drying material, in particular a zeolite fixed bed or a packing of zeolite. A zeolite packing is formed in particular by means of loose zeolite granules, preferably in the form of pellets. The drying material and/or sorption material is accommodated in a container or casing of the sorption unit preferably with a largely identical layer thickness. The container of the sorption unit is preferably delimited and/or covered by at least one screen at its air intake opening and/or air output opening in each case. This enables, in a practicable fashion, compact mounting of the sorption material with adequate air permeability at the same time so that the sorption material can both adequately absorb moisture from through-flowing air by means of condensation and also release and/or desorb stored moisture to through-flowing air by means of heating.

In accordance with a further advantageous development of the invention the said one or more flow-conditioning means are realized in such a way that the airflow flows through the sorption unit of the sorption dryer device with an essentially identical volumetric flow per unit of area and/or volume of the drying material of the sorption unit. This homogenization of the airflow with reference to as many as possible, and in particular all, of the intake points of the air intake cross-section area of the sorption unit ensures, to an improved degree, that the drying material of the sorption unit can be desorbed, i.e. de-humidified, in an energy efficient fashion and also largely completely in a short time by means of a heat contribution by using airflow so that its entire volume is available for the next sorption operation, such as for the "drying stage" of a subsequent dishwashing program for example, in a largely completely dry state. Due to the shortening of the time-span between the start time of the airflow, such as upon the starting of a dishwashing program for example, and the time at which regeneration ends for the sorption unit, the heat contribution expended for the desorption and/or the energy expenditure for heating the air flowing through can be used in a recuperative fashion almost completely for heating a washing liquor or a washing bath, crockery to be washed, and/or air in the washing container in a subsequent new program step, such as "Prewash" or "Clean" for example. Unacceptable waiting times for regeneration of the sorption unit and also undesirable losses of the heat energy expended for the desorption are therefore largely prevented.

Conversely, the adsorption performance of the sorption unit, i.e. its ability and/or capacity to capture moisture out of the air flowing through, such as in the "drying stage" of a dishwashing program for example, and in particular to cause it to condense, can naturally also be increased in this fashion compared to the case of unconditioned flow conditions.

In particular, it can be advantageous if the said one or more flow-conditioning means condition the airflow in such a way that essentially as many as possible, and preferably all, of the points of the intake cross-section area of the sorption unit of the sorption dryer device, which unit is fitted with reversibly dehydratable drying material, is permeated by a volumetric airflow of largely the same intake temperature. As a result, a more improved, and in particular more defined and greater desorption performance of the sorption dryer device can be ensured.

It can be expedient in accordance with a further advantageous development of the invention if the said one or more flow-conditioning means condition the airflow in such a way that essentially every point of the intake cross-section area of the sorption unit of the sorption dryer device, which unit is fitted with reversibly dehydratable drying material, is permeated by a volumetric airflow of largely the same flow velocity. In particular, equalizing the flow velocities of the airflow at the various inflow locations of the intake cross-section area of the sorption unit enables improved desorption and/or adsorption.

In particular, it can be expedient to shape the casing of the sorption dryer device and position it in the dishwasher in such a way that it can be permeated by an essentially vertical airflow. As a result, the sorption unit can be arranged preferably in an essentially horizontal positional plane within the casing of the sorption dryer device. If it contains a sorption material packing, and in particular a zeolite packing, one-sided and uncontrollable shifts of material and undesirable layering of the material, such as can occur in the case of an obliquely placed sorption unit for example, are therefore largely prevented, so that an even layer thickness of sorption material can be ensured when viewed across the width of the through-flow opening of the sorption unit and therefore defined, even through-flow conditions can be maintained in a sustained fashion. As a result, this furthermore makes it possible, in an advantageous way, to accommodate the sorption dryer device in particular in a base module underneath the washing container of the dishwasher as a flat, compact constructional unit.

In accordance with a further expedient development of the invention, the sorption dryer device is connected via at least one air-routing duct to at least one outlet and to at least one inlet of the washing container. In this respect, the air-routing duct is preferably arranged largely outside the washing container. The outlet-side pipe segment of the air-routing duct is preferably connected to at least one inlet of the washing container in the zone near the base of the said container. The inlet-side pipe segment of the air-routing duct, on the other hand, is expediently connected to at least one outlet of the washing container in the zone near the roof of the said container. This largely prevents the eventuality that water or washing liquor can get into the air-routing duct and from there into the sorption dryer device during the aspiration of air from the washing container, which would otherwise result in a undesirable saturation of its sorption material, so that the adsorption and desorption effect of the sorption material would be lost.

In particular, it can be expedient if the inlet-side pipe segment of the air-routing duct opens into the casing of the sorption dryer device in the zone near the base in such a way that its inflow direction is deflected into the through-flow direction of the casing, and in particular by around 90°. As a result of this in particular, the sorption dryer device can be accommodated in a space-saving fashion in the lower base of the dishwasher. Moreover, a main flow direction from bottom to top through the sorption dryer device can be predefined as a result so that the sorption material of the sorption unit can be permeated in a largely straight line. Furthermore, the air from the air-routing duct can be routed to the sorption dryer device such that, in the case of warming or heating by using at least one heating element before the intake opening of the sorption unit, it already flows from bottom to top through the sorption unit due to its own convection and, in the zone of the base of the washing container, it gets into its interior through at least one inlet.

In accordance with an advantageous development of the invention at least one blower for generating or supporting the airflow is provided before the sorption unit of the sorption dryer device when viewed in the direction of flow of the airflow. In particular, the blower or a fan is inserted into the inlet-side pipe segment of the air-routing duct before the sorption dryer device for generating the airflow to the sorption unit of the sorption dryer device.

By way of advantage, at least one allocated heating element for desorption is provided between the blower and the sorption unit with the reversibly dehydratable drying material of the sorption dryer device when viewed in the direction of flow. In particular, it can be accommodated within the casing of the sorption dryer device, before the said device's sorption unit with the reversibly dehydratable drying material when viewed in the direction of flow, as a constituent of the sorption dryer device for the said material's desorption. As a result, on the one hand, heat losses due to excessively long flow paths are largely prevented. On the other hand, local overheating of the sorption material is largely prevented, such as could occur in the case of direct contact between the sorption material and a heating coil laid within it for example. Because the heated air can now flow through the sorption material of the sorption unit more evenly, i.e. in a more distributed or balanced fashion, with a homogenized flow cross-section profile imposed by the flow-conditioning means. In particular, if the sorption dryer device is installed in the lower base of the dishwasher and has a vertical main direction of flow, it can be expedient to provide the heating element underneath the intake cross-section area of the sorption unit within the casing of the sorption dryer device.

In particular, the respective heating element extends essentially across the entire clear span of the intake cross-section area of the sorption unit with the reversibly dehydratable sorption or drying material. As a result, it is possible to heat the airflow in the area of the longitudinal walls extending in the depth direction also, i.e. in particular at the side edges, of the sorption unit just as in the central area of the cross-section width of the sorption unit. As a result, local moist points in the drying material, in particular in the zone of the side walls of the sorption unit, are largely prevented during desorption. If the width of the sorption unit essentially corresponds to the internal width of the casing of the sorption dryer device, the heating element preferably runs essentially across the entire internal width of the casing of the sorption dryer device before the intake cross-section area of the sorption unit. In order to be able to heat the intake cross-section area of the sorption unit over the greatest area possible and hence largely homogenously for the desorption of its sorption material volume, so that local heating deficiencies in the sorption material volume are largely prevented, it is preferably laid in a wavy line pattern and/or meandering pattern when viewed in the depth direction of the sorption unit, and in particular of the casing, of the sorption dryer device. The meander windings of the heating element preferably run to and fro between the two side walls of the casing of the sorption dryer device over the full internal width of the intake area of the sorption unit. In particular, the windings of the heating element lie in roughly the same positional plane in this respect.

In accordance with an advantageous development of the invention, the said one or more flow-conditioning means are provided in such a specific way for the heating element between the blower and the heating element when viewed in the direction of flow that a flow is brought about with largely the same volumetric air flow, and in particular the identical flow velocity, at as many points as possible, and in particular essentially at every point of the flow surface of the heating element. In particular, the heating element sits within the casing of the sorption dryer device before the intake area of the said device's sorption unit with a predefinable gap spacing in such a way that an "air heating" is brought about for the sorption material of the sorption unit. The flow-conditioning means for the heating element are expediently accommodated within the casing of the sorption dryer device before the heating element positioned there, when viewed in the direction of flow. This makes a compact constructional unit possible. Furthermore, this creates the opportunity to be able to impose on the airflow, in a simple and reliable fashion, a homogenized flow cross-section profile before reaching and flowing over the heating element. If the heating element essentially extends over the whole width of the sorption intake area, the conditioning means positioned in front of the heating element when viewed in the direction of flow preferably extends largely over the width of the heating element so that a largely isothermal heat transfer is ensured across the width of the heating element from the said heating element to the airflow flowing past. The conditioning means before the heating element is expediently also adapted in terms of the depth extension of the said means. In general terms, therefore, the conditioning means essentially has the outer, input-side flow area occupied by the heating element as a dimension and sits with a predefinable flow spacing as to gap before the said element, whereby it lies in particular parallel and also congruent with respect to the flow area of the heating element.

The heating element expediently has at least one heating rod or at least one wire coil. This makes a particularly inexpensive, simple and reliable heating of the airflow possible.

It can be expedient in particular if the wire coil or heating coil has an expanding, and in particular conical, geometric shape. As a result, the wire coil can not only bring about the heating of the airflow for the desorption of the sorption material of the sorption unit but additionally serve as a flow-conditioning means for homogenizing the airflow. If the central axis of the wire coil is aligned in the direction of flow, it is largely ensured that an incoming airflow component only flows over and/or round just one of the heating coil segments arranged at various pitch locations on its flow path and does not meet heating coil segments lying one behind the other in multiple events. Local overheating of the heating coil is largely prevented in this way.

It can be advantageous under some circumstances if the heating rod or the wire coil is additionally encapsulated by an outer forced flow pipe. This makes it possible to achieve an increased flow velocity of the air, with which the said air flows over the heating rod or the wire coil, so that an increased, efficient heat transfer is brought about from the heating rod or the wire coil to the airflow.

In accordance with a further advantageous development of the invention, at least one heating element, such as a heating rod, a heating coil or a heating worm for example, can be accommodated in an additional pipe segment within the air-routing segment to the sorption dryer device and/or the said device's casing. This allows a simple installation arrangement for the heating element and a simple connection to the sorption dryer device. In this respect, the end facing the inlet-side air-routing duct segment is preferably open for the purpose of the inflow of air. In particular, the pipe can serve advantageously as a conditioning means and be realized in such a way that, when viewed across the longitudinal course of the respective heating element, an essentially identical heat release is brought about at every location of the pipe for air flowing into the pipe, i.e. the airflow can be heated largely by means of an isothermal heat transfer along the longitudinal extension of the heating element in the interspace or gap between the heating element and the outer pipe surrounding the said element externally with a radial gap spacing or free space. In this way, a homogenization of the airflow in terms of the said airflow's local temperature profile can be brought about during the heating operation for the desorption of the sorption unit. To this effect, it can be expedient in particular if the pipe tapers in terms of its passage cross-section area when viewed in the direction of flow. As a result, the flow velocity of the airflow entering the pipe can be made higher toward the end of the pipe in order to be able to equalize a fall in the static pressure by means of an increase in the dynamic pressure there.

The pipe expediently has one or more air output openings on its end and/or its top side, through which air can flow out in the direction of the sorption unit of the sorption dryer device in such a way that a homogenization is produced in terms of volumetric throughput and/or intake temperature for the incoming air at the intake area of the sorption unit.

Additionally to or independently of this, it can be expedient in particular to arrange at least one perforated or slotted plate as a flow-conditioning means in at least one positional plane above and/or below the heating element. The void or gap spacing of the perforated or slotted plate or the pipe segment from the heating element and/or the size of the holes or slots in the perforated or slotted plate or in the pipe are selected in particular in such a way that the sorption unit of the sorption dryer device essentially receives an even incoming flow with reference to its intake cross-section area in terms of volumetric throughput of air and/or intake temperature.

Furthermore, it can be expedient under some circumstances if fins for conditioning the flow and/or enlarging the surface of the heating element are provided on the heating element.

In accordance with a further advantageous development, it can be expedient if the said one or more flow-conditioning means are provided in such a specific way for the sorption unit between at least one heating element and the sorption unit of the sorption dryer device when viewed in the direction of flow that as many points as possible, and in particular essentially every point of the intake cross-section area of the sorption unit of the sorption dryer device, which unit is fitted with reversibly dehydratable drying material, is struck by and permeated by largely the same volumetric airflow, and in particular by a volumetric airflow of the same flow velocity, and/or the same temperature, in each case.

In accordance with an advantageous development of the invention, the one or more flow-conditioning means are formed by at least one flow-guiding facility, and in particular at least one guide plate deflecting the airflow. These flow deflection components can be manufactured particularly simply in design terms and can be arranged before the intake area of the sorption unit in the air-routing duct to and/or in the casing of the sorption dryer device. In particular, they are realized as a type of flow rectifier.

As an alternative to this, it can be expedient to realize one or more flow-conditioning means by means of at least one perforated grating and/or at least one perforated or slotted plate, which likewise can be manufactured simply in design terms. For the purpose of homogenizing the airflow, the holes and/or slots in the perforated grating and/or the perforated or slotted plate are preferably selected so as to be of different sizes.

Additionally to or independently of this, it can also be advantageous under some circumstances to realize the sorption unit itself at least partly as a flow-conditioning means for bringing about a largely even through-flow. In particular, the respective screen, which delimits the air intake and/or air output of the sorption unit, can at least partly form a flow-conditioning means by the corresponding selection of its screen apertures for example.

In accordance with an advantageous development of the invention, the sorption dryer device is connected in an air-conducting fashion by way of at least one air-routing duct to the washing container. Within the said washing container, a blower for aspirating air from the washing container and generating an airflow to the sorption dryer device is preferably provided in an inlet-side duct segment. The said device has in particular a heating mechanism in its casing, which mechanism is arranged before the intake area of the device's sorption unit containing reversibly dehydratable drying material. The blower or fan generates an airflow through the sorption dryer device. At least one flow-conditioning means for homogenizing the airflow is provided before the output of the airflow from the sorption unit when viewed in the direction of flow.

Due to the means for flow conditioning, the flow that flows through the sorption dryer device can be influenced in such a way that it warms in an essentially even and complete fashion the reversibly dehydratable drying material contained in the sorption unit and releases stored water into the washing container of the dishwasher as water vapor, for example for a desorption operation. Conversely, moisture can be absorbed in improved fashion during the sorption operation from the moist air, which is conducted through the sorption unit by way of at least one air-routing duct during the "drying stage" of the dishwasher for concluding a dishwashing program for example, in improved fashion, i.e. with a higher efficiency, by the said unit's sorption material. The sorption unit can therefore be used in improved fashion both during desorption and sorption since the reversibly dehydratable drying material of the sorption unit is employed particularly effectively with reference to its adsorption and desorption property. Any uneven flow profile at the output of the blower is equalized and an uneven flow distribution inside the sorption unit with reference to the, and in particular all the, units of area and/or volume of the reversibly dehydratable drying material is largely prevented.

In an advantageous embodiment of the invention, the said one or more flow-conditioning means are arranged between the blower and the sorption unit of the sorption dryer device. In this respect, the airflow can be influenced in a suitable fashion before the intake into the sorption unit so that the sorption facility can be operated effectively.

If the sorption unit itself is realized at least partly as a flow-conditioning means in accordance with a special embodiment of the invention, in order to bring about an even through-flow, then an at least largely complete utilization of the properties of the reversibly dehydratable material can be effected, by way of example, by means of a suitable back pressure of the flow air at the sorption unit or by using a different flow resistance that is adapted to the airflow actually present, across the through-flow area of the sorption unit where relevant.

A heating mechanism is preferably arranged between the blower and the sorption dryer device in a flow duct. Additionally to or independently of this, a largely even temperature distribution across the heating cross-section of the heating mechanism and/or fixed bed cross-section of the sorption unit can also be achieved by means of an even flow velocity. As a result, "Hot Spots" and cold points in the sorption unit are largely prevented.

By way of advantage, the facility for flow conditioning is arranged between the blower and the heating mechanism and/or between the heating mechanism and the sorption unit. It is advantageous in particular to realize the facility for flow conditioning in such a way, as a function of the blower used and the heating mechanism and also the geometric conditions of the flow conduction between the blower, heating mechanism and sorption unit and also of the casing in which the heating and/or the sorption unit are arranged, that it is arranged at the most effective point of the airflow path. It is particularly advantageous if an attempt is made to achieve an essentially even temperature distribution and at the same time an essentially even flow profile at the sorption unit by using the facility for flow conditioning.

By way of advantage, the respective flow-conditioning means or flow-conditioning facility is in particular realized in such a way that the airflow flows through the sorption unit with an essentially identical volumetric flow per unit of area and/or volume of the sorption unit. This achieves an optimal utilization of the reversibly dehydratable material. No essential inhomogeneities arise in the heating and/or through-flow of the material so that the absorption of moisture during sorption and/or the release of moisture during desorption can be effected in a largely evenly distributed fashion with reference to the dehydratable material present.

For the same purpose, it can be advantageous if the flow-conditioning facility is in particular realized in such a way that the airflow flows through the sorption unit with an essentially identical intake temperature across the intake cross-section area. This also means that the material can be utilized in an optimal fashion with reference to its storage capacity, for a sorption operation, and/or release potential, for a desorption operation.

By way of advantage, the facility for flow conditioning is in particular a flow-guiding facility. By using the flow-guiding facility, the flow is preferably guided in such a way in its profile, its direction and/or where relevant its velocity that the objective of an even flow through the sorption dryer device, and in particular the sorption unit, is achieved.

In a preferred embodiment of the invention, the facility for flow conditioning consists of a perforated grating and/or a perforated or slotted plate. The perforated grating, perforated plate or slotted plate are in particular arranged in the flow in such a way that the inflowing air to be conditioned is conditioned in such a way at the entry into the sorption unit that it flows through the sorption dryer device, and in particular the sorption unit, in a largely even fashion. The arrangement of the perforated grating, perforated plate or slotted plate can be, in particular, between the blower and the heating mechanism and/or between the heating mechanism and the sorption unit.

In particular, if an uneven flow profile is present at the output of the blower, it can be advantageous if the holes and/or slots of the perforated grating or the perforated or slotted plate are of different sizes. This generates larger or smaller flow resistances which contribute to homogenizing the flow profile in the desired fashion.

In particular, the facility for flow conditioning preferably contains at least one guide plate deflecting the flow. An uneven flow profile that is present at the output of the blower can be homogenized by means of one or more guide plates deflecting the flow. This means that zones of stronger flow are guided into zones with a weaker flow and are mixed with same, so that a largely even flow profile is created overall. This is advantageous in particular in the area of the flow conditioning between the blower and the heating element, but can also provide advantages between the heating rod and the sorption unit.

The sorption unit preferably has a zeolite fixed bed (=molecular sieve) which is delimited by a screen at its intake area and also output area in each case.

If the sorption unit has, across the area of passage of the airflow, a differing layer thickness that forms at least partly the flow-conditioning facility, then in the case of an airflow distributed unevenly across the intake cross-section area, by way of example, a greater layer thickness can be selected at points at which a greater volumetric flow enters, in order to be able to utilize the dehydratable material better. By way of example, the layer can be selected so as to be trapezoidal in cross-section if a smaller volumetric flow enters at one end of the layer than at the other end.

By way of advantage, the sorption unit is delimited by a screen at its air intake and/or air output. The reversibly dehydratable material is therefore held at the point provided in the sorption facility on the one hand, and on the other hand the airflow through the sorption unit is not influenced or where relevant only in the intended fashion. The screen can be formed as a mesh with very small wires for this purpose. But it can also be a perforated plate with identical or different hole shapes or hole sizes for example. This means that the volumetric flow through the reversibly dehydratable material can be influenced in a targeted fashion. If screen apertures of the screen are realized so as to be of different sizes, the screen forms at least partly the flow-conditioning facility by altering the flow, with reference to the flow velocity, the flow direction and/or the volumetric flow by way of example, before or after the screen. Different screens can also be used at the entry and at the exit of the sorption facility in order to influence the flow, by means of a targeted back pressure for example.

If the sorption unit has an identical layer thickness across the area of passage of the airflow, then the material located in the sorption unit is also struck by air evenly per unit of volume, in particular in the case of an airflow flowing evenly into the sorption unit.

If the heating mechanism is realized as a heating rod or a wire coil heating mechanism in particular, a very rapid warming of the air is made possible by the air coming out of the blower flowing past, in particular if the said heating mechanism is arranged in the direction of flow. This means that the airflow can have a relatively long contact with the heating mechanism and as a result there is sufficient time to heat the air to the required temperature.

If the heating mechanism encompasses in particular a wire coil heating mechanism and if the said wire coil is realized in the form of a cone, this means that at least a partial conditioning of the flow is effected at the same time. The air flows through the wire coil heating mechanism, which is realized in the form of a cone, and this means that it is homogenized both in its direction of flow and also in its flow profile and heated to the required temperature at the same time.

If the heating mechanism is arranged in particular in a pipe, this brings about the situation, in an advantageous fashion, that the flow lies close against the heating mechanism and flows along it. This means that the heat transfer from the heating mechanism to the air is accomplished particularly rapidly and effectively.

It can be expedient if the pipe in which the heating mechanism is located is realized as tapering in the direction of flow in its cross-section so that the airflow heats up isothermally and the heating mechanism is subject to a forced flow. This means that a high flow velocity is accomplished, which has an advantageous influence on the heat transfer.

If the pipe in which the heating mechanism is located has one or more air outputs on its end and/or its top side, the air is routed along the heating mechanism for a relatively long time and only moves away once it has taken on the required temperature from the heating mechanism. Due to the air output on the end and/or the top side of the pipe, the air is deflected toward the sorption unit, with the aid of corresponding additional flow-deflecting facilities where relevant, so that the sorption unit can be permeated evenly.

If a perforated or slotted plate is arranged above and/or below the heating mechanism in accordance with a further expedient development, this means, once again in an advantageous fashion, that in particular the flow can be conditioned in such a way that a corresponding even flow is accomplished through the sorption dryer device, and in particular the sorption unit. In this respect, the flow is ideally guided on to the entire area of the sorption unit with identical temperature and identical velocity so that the dehydration of the sorption unit is effected completely, rapidly and evenly.

The spacing of the perforated or slotted plate from the heating mechanism and/or the size of the holes or slots are preferably selected in such a way that the sorption unit receives an even incoming flow. Depending on the constructional nature of the blower, the flow line, the heating mechanism, the casing of the sorption dryer device, and also the device's sorption unit itself, the spacing of the perforated or slotted plate from the heating mechanism and/or the size of the holes or slots are selected in particular in such a way that the flow can be guided through the sorption dryer device, and in particular the sorption unit, evenly. The size of the holes and also the spacing of the perforated or slotted plate from the heating mechanism can also be different over the course of the flow. It is thus possible for example for the spacing of the perforated or slotted plate from the heating mechanism to be reduced and/or the size of the holes or slots to be enlarged, compared to the start of the flow at the heating mechanism, over the course of the flow along the heating mechanism.

Fins in particular are preferably arranged on the heating mechanism for conditioning the flow and/or enlarging the surface of the heating mechanism. This means that it is possible to increase the effectiveness of the heating mechanism. This enlarges the contact surface between the heating mechanism and the air and the heat transfer can be effected more rapidly. At the same time, an alignment and homogenization of the flow, i.e. a flow conditioning, is made possible by means of the fins, so that once again the sorption unit can be permeated evenly.

The foregoing variants and/or the developments reproduced in the subclaims relate to alternative heating mechanism concepts in particular for the desorption of a sorption system. This encompasses, as a so-called sorption column, a sorption unit with reversibly dehydratable sorption material and at least one heating mechanism allocated to the sorption unit. The said heating mechanism is preferably arranged before the intake area of the sorption unit in the direction of flow and operates as a so-called air heating mechanism. A preferably isothermal heating of as many as possible, and preferably all, of the points of the sorption unit is made possible in particular by an identical flow velocity across the flow cross-section of the sorption unit. The principles of this are firstly a flow conditioning in particular between the blower and the sorption unit or between the blower and the container of the sorption unit in terms of the flow volume profile with reference to the intake cross-section area of the sorption unit, and secondly a flow conditioning in the sorption column or sorption dryer device by means of an air-routing to and around the heating mechanism.

In like fashion, the one or more flow-conditioning means also assist the inventive dishwasher to achieve an improvement during the sorption operation, such as is carried out during the drying stage of a dishwashing program for example. In this respect, the heating element of the sorption dryer device is usually switched off and a moist airflow is blown out of the interior of the washing container for dehumidification by means of the sorption material of the sorption unit, preferably with the aid of at least one blower.

An unconditioned incoming flow to the heating mechanism can arise in particular due to an uneven flow profile at the output of the blower and due to an uneven flow distribution inside the sorption column or sorption dryer device. This produces an uneven flow velocity and therefore an uneven temperature distribution across the heating-mechanism and fixed-bed cross-section with "hot Spots" and cold points. If a flow conditioning takes place between the blower and the sorption column or sorption facility, then this is possible by using a conditioning by means of a hole structure, e.g. a perforated plate, for example. A variable structuring of the openings can lead to improvement. Apart from this, a conditioning by means of deflector plates is possible, which can likewise lead to an improvement in the flow.

A flow conditioning in the sorption column or sorption facility can take place in particular via at least one perforated plate/slotted plate. To this effect, a perforated or slotted plate can be arranged preferably above and below the heating mechanism. An even incoming flow to the heating mechanism can be achieved by means of the suitable selection of the spacings of the perforated or slotted plate from the heating mechanism and/or by way of the hole or slot diameter.

An enlargement of the surface of the heating element can be effected in particular by means of a fin structure as in the case of a heat pipe. In this respect, the fins are attached to the heating element, such as a heating rod for example, with the result that a thermal and mechanical connection of the fins to the heating element, such as a heating rod for example, is effected. The fins are preferably arranged in the direction of flow. An enlargement of the surface of the heating mechanism is produced by the fins.

If a wire coil heating mechanism is positioned between the fan and the sorption column or sorption facility, an even warming of the air can be effected across the cross-section and over the length of the heating mechanism in particular if the said mechanism is implemented in the form of a cone. The advantage in this respect is that an overheating of the wire is largely prevented. The wire coil heating mechanism is preferably arranged outside the zeolite container of the sorption unit and results in the even, isothermal warming of the fixed bed of the sorption unit by means of the warmed airflow.

If the heating mechanism is arranged in a pipe, a forced flow over the heating mechanism with a high flow velocity can be effected in particular in the case of a narrowing of the cross-section of the pipe. As a result, the airflow can preferably be heated isothermally. The warmed air can exit at the end of the pipe and/or at least partly at the top and be distributed over the fixed bed evenly by way of the deflection.

Other further treatments of the invention are reproduced in the subclaims.

BRIEF DESCRIPTION OF THE DRAWINGS

In the following, the invention and its further treatments are explained in detail on the basis of drawings:

FIG. 3 shows, in a schematic representation of a longitudinal section, a second advantageous exemplary embodiment of an inventive flow-conditioning means with deflector plates in the air-routing duct for the sorption dryer device for the sorption drying system in FIG. 1, FIG. 4 shows, in a schematic representation of a longitudinal section, a third exemplary embodiment of an inventive flow-conditioning means with perforated or slotted plates above and below a heating element in the casing of the sorption dryer device for the sorption drying system in the dishwasher in FIG. 1, FIG. 5 shows, in a schematic representation of a longitudinal section, a further exemplary embodiment of an inventive flow-conditioning means for the sorption unit of the sorption dryer device for the sorption drying system in the dishwasher in FIG. 1 with the arrangement of a heating element in a pipe, FIG. 6 shows, in a schematic representation of a longitudinal section, a further flow-conditioning means varied with respect to FIGS. 2 to 5 by using a wire coil heating mechanism, FIG. 7 shows, in a schematic representation of a longitudinal section, a further advantageous variant of an inventive flow-conditioning means by using a fin structure on a heating rod, FIG. 8 shows, in a schematic representation of a longitudinal section, a further advantageous variant of an inventive flow-conditioning means by using a reversibly dehydratable material of unequal thickness in the sorption unit of the sorption dryer device in the dishwasher in FIG. 1.

DETAILED DESCRIPTION OF EXEMPLARY
EMBODIMENTS OF THE PRESENT
INVENTION

Elements with identical function and mode of operation are provided with the same reference symbols in each case in FIGS. 1 to 9.

Figure 1:
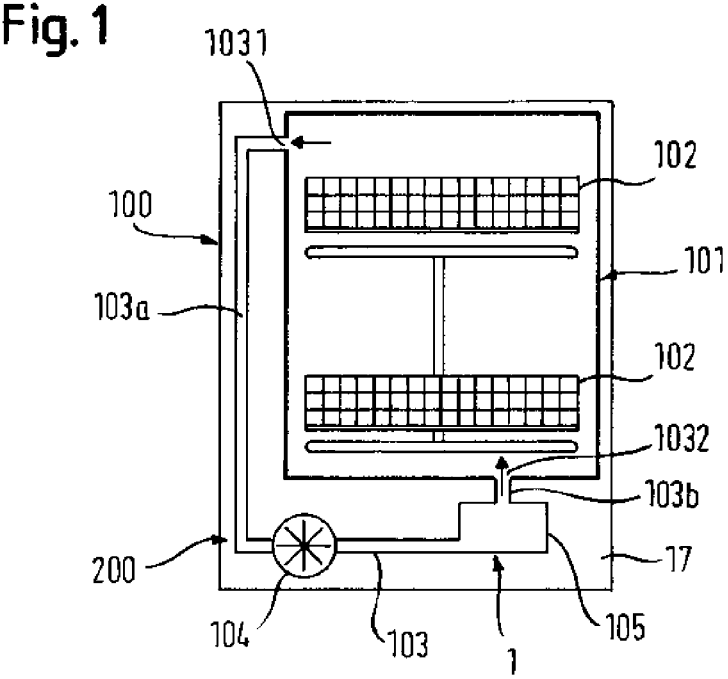
FIG. 1 shows, in schematic form, a dishwasher with a washing container and a sorption drying system, which has a sorption dryer device with at least one heating element and a sorption unit in accordance with the inventive design principle.

FIG. 1 shows, in schematic form, a dishwasher 100 with a washing container 101 and a sorption drying system 200. This is preferably provided externally, i.e. outside the washing container 101 of the dishwasher 100. It includes as main components an air-routing duct 103, at least one blower or one fan 104 and also a sorption dryer device 105. One or more lattice baskets 102 for example are accommodated within the washing container 101 for receiving and washing items of crockery. The sorption dryer device 105 is connected via the air-routing duct 103 to at least one outlet 1031 and at least one inlet 1032 of the washing container 101. In this respect, the air-routing duct 103 is arranged largely outside the washing container 101. In detail, the inlet-side pipe segment 103a of the air-routing duct 103 is connected to the outlet 1031 of the washing container 103 in the said container's roof zone. The outlet-side pipe segment 103b of the air-routing duct 103 leads to the inlet 1032 of the washing container 103 in the said container's base zone. In this way, air can be routed from the interior of the washing container 101 via the air-routing duct 103 to the sorption dryer device 1, e.g. during a drying stage of a dishwashing program and when dried by the said device back into the washing container 101, i.e. circulate through the sorption dryer device 1. Due to the air inlet in the upper zone of the washing container 101, the possibility of water getting out of the sump in the base of the washing container or out of the said container's water spraying system (omitted for the sake of clarity) into the air-routing duct and also into the sorption dryer device is largely prevented, which would otherwise make the sorption material there unacceptably moist and unusable.

The sorption dryer device 1 is accommodated in an advantageous fashion here in the exemplary embodiment in a base module underneath the base of the washing container 100. It is realized as a so-called sorption column. This encompasses in a common casing or container 3 at least one heating element 5 (see FIG. 2) and a sorption unit 4 arranged downstream in the direction of flow (see FIG. 2), which is fitted with a reversibly dehydratable sorption material such as zeolite for example. The sorption unit 4 contains in particular a sorption material fixed bed, preferably a zeolite fixed bed, in the form of a molecular sieve or a loose sorption material packing, preferably a zeolite packing. A sorption material packing, and in particular a zeolite packing, is formed in particular by loose granules or other particles, preferably particles of zeolite, preferably in pellet form. The drying material or sorption material is preferably accommodated in the form of a single-ply or multi-ply layer with a largely identical layer thickness within the container or casing 3 of the sorption dryer device 1 in the interspace between two screens or perforated gratings 42, 42' spaced apart from each other in the vertical direction with the aid of a free space while forming the sorption unit 4. In this respect, the two screens 42, 42' are arranged at the predefinable vertical spacing from each other, parallel and also coincident with respect to each other, in horizontal positional planes. In this respect, each screen is essentially realized so as to be flat or level. The two screens are enclosed or enveloped all round their outer periphery at their outer edges by the outer jacket of the casing 3 in the form of an outer delimitation. The sorption unit 4 is arranged in the casing 3 of the sorption dryer device 105 and also in an essentially horizontal positional plane. In this way, the sorption unit 4 is delimited or covered at its air intake opening and/or air output opening in each case preferably by at least one screen or grating so that sorption material particles, and in particular zeolite particles, are prevented from falling out of the container of the sorption unit and at the same time air can flow through the interior of the sorption material from the air intake opening to the air output opening. The sorption unit 4 preferably has a largely flat entry-side inflow area and largely flat exit-side outflow area. A sorption unit of this type enables, in a practicable fashion, a compact mounting of the sorption material with adequate air permeability at the same time so that the sorption material can both adequately absorb moisture from through-flowing air by means of condensation for a sorption operation and also release or desorb stored moisture to through-flowing air by means of heating for a desorption operation for regeneration of the sorption material.

In place of a common outer wall with the sorption dryer device 1, the sorption unit 4 can naturally also have its own outer casing, which encloses the two screens spaced apart from each other with the sorption material packed in between.

The casing 3 of the sorption dryer device 105 is shaped and positioned underneath the base of the washing container 101 in such a way that it can be permeated by an essentially vertical airflow 16. This means that it allows a direction of passage through its integrated sorption unit 4 from bottom to top. For the purpose of feeding air, the downstream end segment of the inlet-side pipe segment 103a of the air-routing duct 103 opens into the casing 3 of the sorption dryer device 105 in the zone of the said device's casing floor or casing base. In the exemplary embodiment, the downstream end segment of the inlet-side pipe segment 103a runs here essentially in a horizontal positional plane on the floor of the casing 3 to the sorption dryer device 1. In this respect, it is essentially connected flush with the lower base of the casing 3. It is coupled to the casing 3 near the base in such a way that an airflow routed within it is deflected from an originally roughly horizontal through-flow direction 13 into a roughly vertically running flow direction 16 through the casing 3, roughly by 90° in this instance. In more general terms, an incoming airflow 14 in the inlet-side pipe segment 103a is deflected from its original inflow direction 13 in the zone near the base or in the zone of the chamber floor of the casing 3 into the said casing's through-flow direction 16. In this respect, the through-flow direction 16 through the casing 3 is in particular a flow direction which runs through the casing essentially in a straight line from the closed casing floor to a roof-side outlet opening or to an outlet connection 600 in the roof of the casing 3, to which the downstream end segment of the outlet-side pipe segment 103b of the air-routing duct 101 is connected. In the case of a through-flow direction of this type, the horizontally mounted layer with the sorption material in the sorption unit 4 is penetrated or traversed essentially vertically by a through-flowing airflow.

For the desorption of the reversibly dehydratable sorption material 41 of the sorption unit 4, at least one heating element 5 is provided in the casing 3 in the near zone before the intake area of the sorption unit 4, in order to provide an air-heating mechanism for the sorption material 41. In this respect, the heating element 5 is positioned in a positional plane before the intake area, which has a predefinable gap spacing from the said intake area for the prevention of local overheating of the sorption material 41 at the said material's entry surface and runs essentially parallel to same. The heating element 5 is preferably formed by a heating rod or a heating coil. In particular, the respective heating element 5 extends essentially across the entire clear span of the intake cross-section area of the sorption unit 4 with the reversibly dehydratable drying material 41. As a result, it is possible also to heat the airflow in the area of the longitudinal walls extending in the depth direction also, i.e. in particular at the side edges, of the sorption unit 4 just as in the central area of the cross-section width of the sorption unit 4. As a result, local moist points in the drying material 41, in particular in the zone of the side walls of the sorption unit 4, are largely prevented during desorption. If the width of the sorption unit 4 essentially corresponds to the internal width of the casing 3 of the sorption dryer device 1, the heating element 5 preferably runs essentially across the entire internal width of the casing 3 of the sorption dryer device 1 before the intake cross-section area of the sorption unit. In order to be able to heat the intake cross-section area of the sorption unit 4 over the greatest area possible and hence largely homogenously for the desorption of its sorption material volume, so that local heating deficiencies in the sorption material volume are largely prevented, the heating element 5 is preferably laid in a wavy line pattern or meandering pattern when viewed in the depth direction of the sorption unit, and in particular of the casing, of the sorption dryer device, as illustrated in the plan view in FIG. 9 in the open state of the sorption dryer device 1. The meander windings of the heating element preferably run to and fro in the depth direction between the two side walls of the casing 3 of the sorption dryer device 1 over the full internal width of the intake area of the sorption unit 4. In particular, the windings of the heating element 5 lie in roughly the same positional plane in this respect.

For the generation of an airflow 14 through the air-routing duct 103, the blower 104 is provided in the inlet-side pipe segment 103a before the sorption unit 4 of the sorption dryer device 105 when viewed in the direction of flow, which blower generates an uneven airflow when viewed across the air-routing duct cross-section of the air-routing duct 103.

Viewed in summary, therefore, the air-routing duct 103 leads, starting from the washing container 101, to the sorption dryer device 1 and from there back again into the washing container 101. The blower 104 is arranged in the air-routing duct 103 before the sorption dryer device 1, with which blower air is aspirated out of the washing container 101 and blown back into the washing container through the sorption dryer device 1. In the sorption dryer device 1, the aspirated air is firstly dried, in that the reversibly dehydratable sorption material located within it absorbs moisture, and secondly the sorption material is dried again, that is to say dehydrated, with the aid of at least one heating element at certain time intervals, in order to be made ready for the absorption of moisture from the air again.

Figure 2:
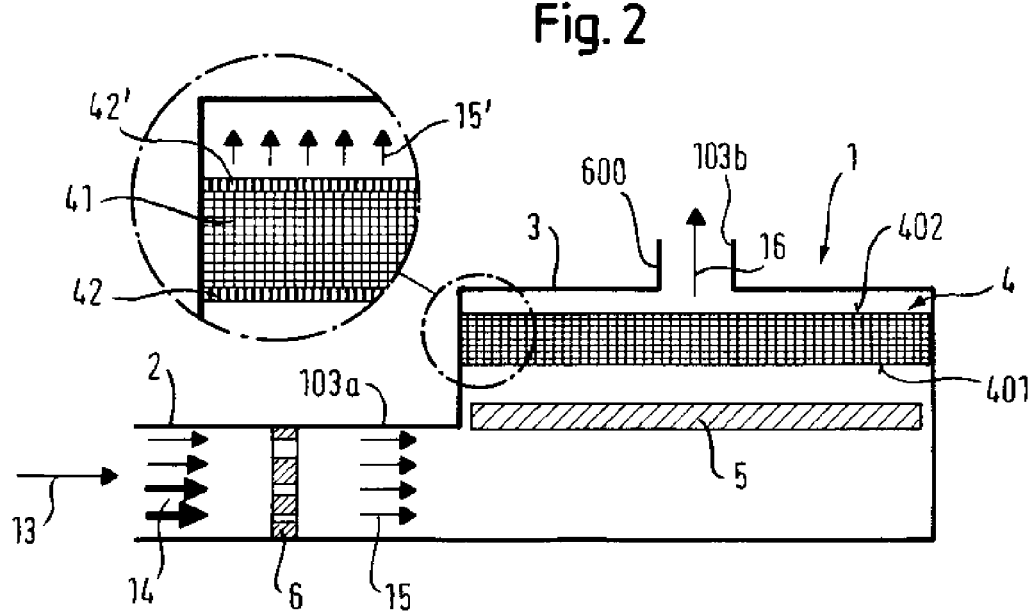
FIG. 2 shows, in a schematic representation of a longitudinal section, a first advantageous exemplary embodiment of an inventive flow-conditioning means with a hole structure in the air-routing duct for the sorption dryer device for the sorption drying system in FIG. 1.
Figure 9:
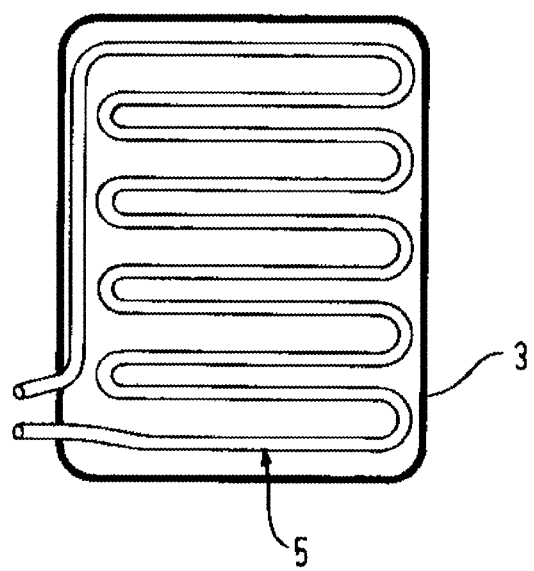
FIG. 9 shows, in a schematic plan view, a heating element that is laid out in a meandering pattern in a common, flat positional plane underneath the sorption unit in the casing of the sorption dryer device for the sorption drying system in the dishwasher in FIG. 1.

In order then to support the reversibly dehydratable sorption material as effectively as possible during sorption and/or in particular chiefly during desorption and increase the efficiency of the material compared to conventional sorption dryer devices, at least one flow-conditioning means is provided in the course of the air path of the airflow between the blower and the air intake area of the sorption unit for the homogenization of the flow cross-section profile of the airflow as it flows through the sorption dryer device. The one or more flow-conditioning means are provided before the intake of the airflow into the sorption unit of the sorption dryer device, after the blower when viewed in the direction of flow. In FIG. 2, by way of example, the flow-conditioning means 6 in the inflow zone of the inlet-side pipe segment 103a of the air-routing duct 103 coming from the blower 104 is inserted into the casing 3 of the sorption dryer device 1.

As an alternative to this, the respective flow-conditioning means can also be accommodated as a constituent in the casing 3 of the sorption dryer device 1. Thus, by way of example, in the variant in FIG. 4, flow-conditioning means 8.1, 8.2 are integrated in the near zone before the sorption unit 4 together with the said unit's associated heating element 5 in the casing 3.

In FIG. 2, the sorption dryer device 1 of the sorption drying system 200 is represented schematically in a longitudinal section as a detail of the dishwasher 100 in FIG. 1 together with the inlet-side pipe segment 103a and also the outlet-side pipe segment 103b of the air-routing duct 103. The washing container 101 and also further components or constituents of the dishwasher 101 have been omitted for the sake of clarity. In this exemplary embodiment, an airflow fed perpendicular to the sorption unit 1 is heated by using a heating mechanism, a heating rod in this instance, in the near zone before the intake area of the sorption unit 1 in the casing 3 of the sorption dryer device 1.

The inlet-side pipe segment 103a of the air-routing duct 103, coming from the outlet 1031 of the washing container 101 in an air-conducting fashion, flows into the base zone of the casing 3 of the sorption dryer device 1. In accordance with FIG. 1, the inlet-side pipe segment 103a has the blower 104 in its longitudinal course for the circulation of air from the interior of the washing container 101 via the sorption dryer device 1 and also the outlet-side pipe segment 103b connected to same back into the washing container 101, which blower generates an uneven airflow 14 when viewed across the air-duct cross-section of the air-routing duct 103. This is represented by means of uneven arrows of various thicknesses with reference to a through-flow area of the inlet-side pipe segment 103a at a longitudinal point 2 before the flow intake zone or inflow zone of same into the casing 3 of the downstream sorption dryer device 1. Prior to this uneven flow 14 flowing into the casing 3 of the sorption dryer device 1, the flow-conditioning means 6 is inserted, when viewed in the direction of flow, after the blower 104 in the inflow zone of the inlet-side pipe segment 103a even before the said pipe segment's intake opening near the base into the casing 3 of the sorption dryer device 1. In the present exemplary embodiment, the flow-conditioning means 6 is formed by means of a structure with a large number of air passages or passage openings arranged so as to be distributed across the duct cross-section area, such as a hole structure for example, a perforated plate in this instance, by means of which the incoming uneven airflow 14 from the blower 104 is homogenized. This airflow 15, which is homogenized across the cross-section of the inlet-side pipe segment 103 of the air-routing duct 103a, which is indicated by means of arrows drawn equally thick after the perforated plate in FIG. 2, flows over the heating element 5 before the sorption unit 4. The perforated plate 6, which is represented as an outline diagram in FIG. 2, has differing openings here in the exemplary embodiment in such a way that flow zones of the airflow that are stronger are exposed to a higher resistance than flow zones of the airflow that are weaker. To this effect, in more general terms, passages with a smaller passage area are preferably allocated to the, or several of the, stronger flow zones of the airflow with reference to the respective flow cross-section than to the, or several of the, weaker flow zones of the airflow. This means that a conditioning of the airflow is possible so that after the perforated plate, the flow is largely homogenized across the cross-section of the air-routing duct 103. In place of the perforated plate 6, it is also possible by way of advantage to arrange a perforated grating or a slotted plate. The respective selection of a preferred means for the flow conditioning is dependent in particular on the constructional circumstances and by way of example also the blower used. Due to the flow conditioning, it is ensured that the air flowing past the various segments of the heating element 6 is heated largely isothermally, i.e. largely the same heat transfer is effected from the heating element 6 to the airflow 15 flowing past essentially at all points in the positional plane of the heating element 6, so that the said heating element is heated largely evenly at every point of the air intake area of the sorption unit 4, i.e. arrives with roughly the same inflow temperature and flows into same. In this way, with reference to the respective through-flow cross-section area of the sorption unit, a largely homogeneous heating of its sorption material can be brought about for its desorption.

Viewed in summary, a facility for flow conditioning is provided here in the exemplary embodiment in FIG. 2 in the inlet-side pipe segment 103a of the air-routing duct, when viewed in the direction of flow, after the blower 104 or in the casing 3 of the sorption dryer device 1 before the heating element 5 of its sorption unit 4 in order to condition the airflow 14 from the blower 104 so that it can be heated as evenly as possible and routed evenly through the sorption unit 4. An enlarged segment of the sorption unit 4 represents its exemplary structure in detail in FIG. 2. It can be seen from this that the reversibly dehydratable material 41 is arranged between the two screens 42, 42'. The screens 42, 42' have air passage openings, which can be shaped according to need. They can form a larger or smaller flow resistance, on the one hand, for the passage of the conditioned airflow 15 and, on the other hand, retain the sorption material 41 in the location provided in the casing 3 so that it is not pulled along or damaged, by way of example, by the airflow. Even in the event that the sorption material 41 involves granules, it is retained correspondingly at the location provided by the screens 42, 42'. The airflow 15 ideally flows through the sorption unit 4 in the form of an even volumetric flow per unit of area and/or volume so that even after passing through, it exits in the form of an even airflow 15' from the output area of the sorption unit 4 into the outlet-side pipe segment 103b of the air-routing duct 103.

As an alternative to the positioning of the flow-conditioning means before the casing 3 shown here in the exemplary embodiment in FIG. 2, it can in particular be particularly advantageous if the flow-conditioning means 6 is arranged in the casing 3 underneath the heating element 5 in a positional plane parallel to the said element with a predefinable free space. In this respect, it preferably extends across the entire through-flow cross-section area of the casing. The flow-conditioning means 6, the heating element 5, and also the sorption unit 4 are therefore positioned with predefinable vertical spacings one behind the other in parallel positional planes with respect to each other in the casing 3 of the sorption dryer device 1 in a columnar fashion or in a row. In particular, they are arranged so as to be congruent with respect to each other. In this respect, the flow-conditioning means 6 preferably sits above or at least in the vertical zone of the upper edge of the inflowing, inlet-side pipe segment 103a in the casing 3.

Here in the exemplary embodiment in FIG. 2, the flow-conditioning means 6 therefore brings about a situation where, with reference to the respective through-flow cross-section area, in the direction of flow after the flow-conditioning means 6, all flow components of the airflow 15 flowing toward the heating element 5 are roughly equally large in terms of their through-flow velocities, i.e. they advance with roughly the same propagation velocity at all locations of the cross-section area that they flow through. Due to an airflow homogenized in this way, the flow components of which, with reference to the respective cross-section area of passage of the sorption unit, essentially have the same propagation velocity and/or the same intake temperature, roughly the same portion of heat is transferred in each case to these roughly equally rapidly propagating flow components by the heating element 5 so that, with reference to its intake temperature and flow velocity, a roughly equally distributed, i.e. largely homogeneous airflow, passes through the intake area of the sorption unit 4 that lies behind the heating element 5. This design variant with the flow-conditioning means positioned in front of the heating element therefore largely ensures that the flow components of the airflow, which are heated with roughly the same amount of heat, and which arrive at the various locations of the intake area of the sorption unit have essentially the same intake temperature and at least by way of approximation the same flow velocity at every point of the intake area. This allows a situation to be achieved where the airflow 15 flows through the sorption unit 4 with an essentially identical volumetric flow per unit of area and/or volume of the drying or sorption material 41 of the sorption unit 4 so that the entire volume of the sorption material 41 can be desorbed largely evenly without undesirable local points of moisture remaining This allows the time duration for the desorption of the sorption material to be shortened compared to a conventional sorption drying system without conditioning means, which reduces the energy to be expended for a largely complete drying of the sorption material.

Conversely, an improved, more even adsorption of moisture, when viewed over the entire intake area of the sorption unit, by the said unit's sorption material can be achieved, additionally or independently of this, due to the flow homogenization with the aid of the flow-conditioning means additionally integrated into the sorption drying system even during the sorption operation of the sorption drying system for the drying of the moist air in the washing container during the drying stage of a dishwashing program of the dishwasher.

FIG. 3 shows a comparable structure of the sorption dryer device 1 to that in FIGS. 1 and 2. In place of the hole structure of the perforated plate 6, the conditioning of the airflow 14 is brought about here with the aid of one or more guide plates 7 or air deflection vanes defecting the airflow 14. Due to the guide plates 7, zones of the airflow 14 with a stronger or more intensive flow, i.e. with a higher flow velocity for example, are deflected into zones with a less intensive flow, in particular with a lower flow velocity for example, in order therefore to accomplish a homogenization of the flow across the cross-section of passage of the inlet-side pipe segment 103a of the air-routing duct 1. The guide plates therefore operate as a type of flow rectifier. The airflow 15 present after the guide plates 7 in the direction of flow is largely homogenized in terms of its flow cross-section profile and therefore enables an even heating by the heating element 5 and an even through-flow though the sorption unit 4. Unlike the exemplary embodiment in FIG. 2, the heating element 5 is arranged in the zone near the base of the casing 3 underneath the top edge of the inflow cross-section of the pipe segment 103a in the exemplary embodiment in FIG. 3 so that the rectified flow 15 flows over it on the bottom side and on the top side. In other respects, the explanations made in the foregoing with respect to the first exemplary embodiment in FIGS. 1 and 2 apply in analogous fashion.

As a variation from the exemplary embodiment in FIG. 2, FIG. 4 shows a sorption dryer device 1 in a schematic representation of a longitudinal section in which the heating element 5 is surrounded by a perforated or slotted plate 8.1, 8.2 above and below along a partial segment or the entire segment of its extension. The upper, first perforated plate 8.1 is arranged above the heating element 5, while the lower, second perforated plate 8.2 is situated underneath the heating element 5 in analogous fashion. In particular, the two perforated or slotted plates 8.1, 8.2 are arranged parallel to the horizontal positional plane of the heating element 5 at a predefinable vertical gap spacing h1, h2. In this respect, the lower perforated plate 8.2 spans the entire area of the lower incoming flow plane of the heating element 5, and the upper perforated plate 8.1 the entire upper incoming flow plane of the heating element 5. The two perforated plates 8.1, 8.2 and also the heating element 5 positioned between them extend largely across the entire clear span of the casing 3 of the sorption dryer device 1. They run, correspondingly, perpendicular to the drawing plane of FIG. 4 essentially along the entire depth extension of the casing 3. In this respect, the lower perforated plate 8.2, the heating element 5 and also the upper perorated plate 8.1 are positioned before the intake area of the sorption unit 4 in the casing 3 above the upper edge of the inflowing inlet-side pipe segment 103a. The lower perforated plate 8.2 essentially forms the imaginary straight-line extension of the upper edge of the inflowing pipe segment 103a. In this way, the airflow 14, which is undefined in the inflow zone 2, and in particular uneven or unequally distributed, flows into the casing 3 as through an extended pipe up to the side wall 500 on the downstream side. This inflow direction is symbolized in FIG. 4 with the aid of an arrow 501. The two perforated plates 8.1 and 8.2 have holes or slots with hole diameters or slot widths that increase in the inflow direction 501. This brings about a conditioning of the original, undefined airflow 14 so that immediately before the intake into the sorption unit 4 an even flow profile is present at every intake point, which is represented once again by arrows of the same type at the intake into the sorption unit 4. The conditioning of the airflow is influenced both by means of differing hole diameters or slot widths D and/or by means of a suitable selection of the vertical spacing $h_1$ or $h_2$ of the respective perforated plate 8.1 or 8.2 from the heating element 5. The perforated plates 8.1 and 8.2 or corresponding slotted plates result in a forced flow of the airflow and push the air more or less strongly on to the heating element 5 so that in the first place an equally distributed heating of the airflow is brought about and also in the second place an equally distributed flow velocity distribution when viewed across the cross-section area of passage of the casing 3. In detail, the lower perforated plate 8.2 conditions the airflow in the vertical direction through the casing 3 in such a way that at every point in the positional plane of the heating element 5, a largely identical amount of heat transfer takes place to the airflow component flowing past at that point. The second, upper perforated plate 8.1, which is arranged downstream of the heating element 5 in the vertical direction of flow 16, serves to provide an airflow 15 over the intake area of the downstream sorption unit 4, which airflow is homogenized in terms of the flow velocity. This means that, at the intake area of the sorption unit, the flow velocities of the flow components at various locations of the conditioned airflow 15 are essentially made identical by means of the flow conditioning. In general terms, the upper-side perforated plate 8.1 between the heating element 5 and the sorption unit 4 and also the lower-side perforated plate 8.2, as flow-conditioning means, condition the undefined incoming airflow 14 in such a way that when viewed across the flow cross-section profile of the sorption unit 4 essentially an identical volumetric flow per unit of area and/or volume of the drying material 41 of the sorption unit 4 flows through with roughly the same intake temperature. Where relevant, the perforated plates 8.1 and 8.2 can also be connected to each other fully or partly, as indicated by broken lines in FIG. 4.

With regard to such a homogenization of the airflow flowing into the sorption unit 4 in terms of temperature distribution and flow velocity distribution when viewed across the intake area of the sorption unit, it can be sufficient where relevant to provide just the lower perforated plate or slotted plate 8.2 and to omit the upper perforated plate 8.1. As a result, the sorption dryer device can, by way of advantage, be made more compact with reference to the height.

In the exemplary embodiment in FIG. 4, an obliquely placed guide plate 9 in the form of a rising ramp in the inflow direction 501 is additionally provided underneath the heating element 5 on the base of the casing 3 in such a way that the inflow cross-section tapers increasingly to the side wall 500 on the downstream side of the casing 3. As a result, the flow velocity is increased by the lower perforated plate 8.2 in the zone where the said plate has larger passage openings than on the upstream side. The airflow 14 flowing into the casing 3 is routed by the guide plate or the baffle 9 increasingly toward the downstream end of the lower perforated plate 8.2 into the vicinity of the heating element 5. The guide plate or the flow baffle 9 therefore brings about an additional forced routing for the incoming airflow 14 and hence an influence on the conditioning of the airflow 14. The spacing d of the guide plate 9 from the heating element 5 decreases in particular starting from the entry of the casing 3 toward the downstream side wall 500, with the result that there in the end-side zone of the inflow aperture of the casing 3, the wrapping of the airflow on to the heating element 5 is increased. The vertical spacing $h_1$ or $h_2$ of the perforated plates 8.1 and 8.2 from the heating element 5 can be constant across the width of the heating element 5 or even be implemented variably so that the flow is wrapped more or less on to the heating element 5.

The outline diagram in FIG. 5 represents a heating mechanism with a heating element 5, which is surrounded by a pipe 10. The pipe 10 forms the straight-line extension of the inlet-side pipe segment 103a into the casing 3 in the zone near the base of the said casing up to roughly the side wall 500 on the downstream side of the casing. It has holes 11 on its top and/or face, in particular on its end segment, which allow the air warmed by the heating element 5 positioned below it to escape. A narrowing of the cross-section of the pipe 10 is provided by the guide plate 9, as a result of which a forced flow is effected over the heating element. Due to the high flow velocity along the heating element 5 brought about as a result, the incoming inward-routed airflow 14 is heated essentially isothermally when viewed across the inflow cross-section area of the pipe 10. At the face end of the pipe 10 and/or on the top side of the pipe 10, the warmed air escapes from the pipe 10 through the holes 11 in such a way that, when viewed across the intake cross-section area of the sorption unit 4, a conditioned airflow 15 with roughly identical flow velocity and identical intake temperature is brought about. Where relevant, one or more further flow-conditioning means can be provided in the interspace between the pipe 10 and the sorption unit 4 in order to route the airflow through the sorption unit 4 as evenly as possible in terms of flow velocity and/or intake temperature.

In FIG. 6, a wire coil heating mechanism 5.1 is provided in the flow intake segment 2 of the inlet-side pipe segment 103a in the form of a combined heating and flow-conditioning means as a further alternative. The air 14 flows through the wire coil heating mechanism 5.1 before the intake into the casing 3 and is flow-conditioned and simultaneously heated by the said mechanism. With regard to the functioning and mode of operation of the wire coil, it is largely unimportant in this respect whether it is aligned such that it tapers or expands in the direction of flow. Its expanded end extends essentially across the entire cross-section width of the inlet-side pipe segment 103a. Due to a corresponding arrangement of the windings of the wire coil heating mechanism 5.1 in the flow intake segment 2 and/or due to additional guide facilities such as in the foregoing exemplary embodiments, an airflow 14 that is uneven across its flow cross-section profile can be equalized so that after the wire coil heating mechanism 5.1 the airflow 15 flows evenly and is warmed evenly. The wire coil heating mechanism 5.1, which is implemented in conical form, therefore results in an even warming of the air across the cross-section and across the length of the heating mechanism. Local overheating of the wire of the wire coil heating mechanism is largely prevented due to its conical geometric shape. Since the various winding segments of the wire coil heating mechanism lie at various radial location points and therefore, when viewed in the direction of flow, do not lie one behind the other in a multiple and coincident fashion, a homogenization of the airflow across the cross-section area of passage of the pipe segment 103a is achieved and therefore also an even isothermal warming of the airflow 15, which finally passes through the sorption unit 4. The homogenization is achieved in particular in that incoming component air masses of the air mass flow 14 are deflected laterally, i.e. in a radial preferred direction, by various coil segments offset radially with respect to each other at different radial positions of the respective cross-section area of passage, and back round the respective coil segment for the purpose of flowing on in an axial preferred direction, so that the various air mass portions of the airflow are made more even in terms of their flow velocity. It can be expedient in particular if the wire coil or heating coil has an expanding, and in particular conical, geometric shape. As a result, the wire coil can not only bring about the heating of the airflow for the desorption of the sorption material of the sorption unit but additionally serve as a flow-conditioning means for homogenizing the airflow. If the central axis of the wire coil is aligned in the direction of flow, it is largely ensured that an incoming airflow component only flows over and/or round just one of the heating coil segments arranged at various pitch locations on its flow path. Local overheating of the heating coil is largely prevented in this way. Because due to the expansion of the wire coil, an air mass component that has been heated at a preceding coil segment can flow out of the wire coil largely in a straight line and unhindered, without meeting a coil segment arranged downstream.

It can be advantageous under some circumstances if the wire coil 5.1 is additionally encapsulated by an outer forced flow pipe. This is designated by 5.2 in FIG. 5. This makes it possible to achieve an increased flow velocity of the air, with which the said air flows over the wire coil, so that an increased, efficient heat transfer is brought about from the wire coil to the airflow 14.

FIG. 7 represents a plan view of the inlet-side pipe segment 103a of the air-routing duct 103 in the flow intake zone 2, in which a heating rod 5 is located as a heating element. A large number of fins 12 are arranged on the heating rod 5, which are connected thermally and mechanically to the heating rod 5. The fins 12 bring about an enlargement of the surface of the heating rod 5, with the result that a more rapid and even warming of the air is brought about when it flows along the heating rod 5 and the fins 12. Apart from this, the fins accomplish a homogenization of the flow profile. By means of a corresponding shaping of the fins, the direction of flow and the intensity of the flow can also be influenced and homogenized.

FIG. 8 shows a further advantageous variant of an inventive flow-conditioning means by using a reversibly dehydratable material of unequal thickness in the sorption unit 4. This makes the resistance to the through-flow of the airflow smaller at the thinner sorption material layer of the sorption unit 4 than at the thicker point. This means that the sorption unit 4 itself already represents an at least partly acting flow-conditioning facility since upon passing through, a stronger airflow is slowed down more in the zone of the thicker sorption material layer than a weaker airflow in the zone of the thinner sorption material layer, with the result that the reversibly dehydratable material is essentially struck by air evenly per unit of area and/or volume.

In particular, combinations of the individually explained variants with each other are possible. By way of example, facilities and heating mechanisms that are represented and described in the flow intake 2 can also be arranged in a pipe 10 or inside the casing 3. The nature of the blower can also be different. Thus, radial or axial blowers are possible, by way of example. Embodiments such as those disclosed in DE 103 53 774 A1 and DE 10 2005 004 096 A1 by way of example, can likewise have the facility for flow-conditioning claimed in the present invention.

Viewed in summary, the following reference symbols in particular are used in conjunction with the foregoing exemplary embodiments:

LIST OF REFERENCE SYMBOLS

1 Sorption dryer device
2 Flow intake
3 Casing
4 Sorption unit
5 Heating element
5.1 Wire coil heating mechanism
5.2 Encapsulation of the wire coil heating mechanism
6 Perforated plate
7 Guide plate
8.1 Perforated plate
8.2 Perforated plate
9 Guide plate
10 Pipe
11 Hole
12 Fin
13 Inflow direction
14 Unconditioned incoming airflow
15 Conditioned airflow 15' Airflow flowing out of the sorption unit
16 Vertical airflow through the casing of the sorption dryer device
17 Base module of the dishwasher
41 Reversibly dehydratable material
42, 42' Screens
100 Dishwasher
101 Washing container
102 Lattice basket
103 Air-routing duct
103a, 103b Pipe segments of the air-routing duct
104 Blower
200 Sorption drying system
401 Intake area of the sorption unit
500 Side wall of the casing of the sorption dryer device
501 Through-flow direction
600 Outlet connection
1031 Inlet of the washing container into the air-routing duct
1032 Outlet of the air-routing duct into the washing container
402 Output area of the sorption unit
D Diameter
d Spacing
h Spacing

The invention claimed is:

1. A dishwasher, comprising:
a washing container;
a sorption dryer device connected to the washing container in an air-conducting fashion, the sorption dryer device including at least one sorption unit with reversibly dehydratable drying material, and a plurality of screens or gratings in which the dehydratable drying material is interspaced;
at least one heating element;
at least one blower disposed upstream of the at least one heating element in a direction of flow, the direction of flow being that which an airflow flows from the washing container; and
at least one flow-conditioning device disposed upstream of the sorption dryer device in the direction of flow and independent of the at least one heating element,
wherein the at least one flow-conditioning device is arranged at least one of between the at least one blower and the at least one heating element when viewed in the direction of the airflow and between the at least one heating element and the sorption dryer device when viewed in the direction of the airflow, and
wherein the at least one flow-conditioning device includes at least one plate, grating, or pipe wall, the at least one flow-conditioning device having a plurality of apertures configured to vary the airflow at different portions of the at least one flow-conditioning device to thereby homogenize a flow cross-section profile of the airflow as the airflow flows through the sorption dryer device.

2. The dishwasher of claim 1, wherein the reversibly dehydratable drying material is one of a zeolite fixed bed and a packing of zeolite.

3. The dishwasher of claim 1, wherein the at least one flow-conditioning device is structured such that the airflow flows through the sorption unit with a same volumetric flow per one of unit of area and unit of volume of the reversibly dehydratable drying material of the sorption unit.

4. The dishwasher of claim 1, wherein the at least one flow-conditioning device is structured to condition the airflow such that every point of an intake cross-section area of the sorption unit of the sorption dryer device is struck by and permeated by a same volumetric airflow.

5. The dishwasher of claim 1, wherein the at least one flow-conditioning device is structured to condition the airflow such that every point of an intake cross-section area of the sorption unit of the sorption dryer device is permeated by a volumetric airflow of a same intake temperature.

6. The dishwasher of claim 1, wherein the at least one flow-conditioning device is structured to condition the airflow such that every point of an intake cross-section area of the sorption unit of the sorption dryer device is permeated by a volumetric airflow of a same flow velocity.

7. The dishwasher of claim 1, wherein the sorption dryer device has a casing that is shaped and positioned such that the casing is permeated by an essentially vertical airflow.

8. The dishwasher of claim 7, wherein the sorption unit is arranged, in an essentially horizontal positional plane with respect to the washing container of the dishwasher, within the casing of the sorption dryer device.

9. The dishwasher of claim 1, wherein the dishwasher has a base module underneath the washing container, and wherein the sorption dryer device is provided in the base module.

10. The dishwasher of claim 1, further comprising at least one air-routing duct, wherein the washing container has at least one outlet and at least one inlet, and wherein the sorption dryer device is connected via the at least one air-routing duct to the at least one outlet and the at least one inlet of the washing container.

11. The dishwasher of claim 10, wherein the air-routing duct is arranged essentially outside the washing container.

12. The dishwasher of claim 10, wherein the washing container has a base; and wherein the air-routing duct has an outlet-side pipe segment that is connected to the at least one inlet of the washing container in a zone near the base of the washing container.

13. The dishwasher of claim 10, wherein the washing container has a roof, wherein the air-routing duct has an inlet-side pipe segment that is connected to the at least one outlet in a zone near the roof of the washing container.

14. The dishwasher of claim 13, wherein the washing container has a base;
wherein the sorption dryer device has a casing; and
wherein the inlet-side pipe segment of the air-routing duct opens into the casing of the sorption dryer device in a zone near the base of the washing container such that an inflow direction of the air-routing duct is deflected into a through-flow direction of the casing.

15. The dishwasher of claim 14, wherein the inflow direction of the air-routing duct is deflected into the through-flow direction by around 90°.

16. The dishwasher of claim 10, wherein the at least one blower generates the airflow towards the sorption unit of the sorption dryer device, wherein the air-routing duct has an inlet-side pipe segment, and wherein the at least one blower is provided before the sorption dryer device in the inlet-side pipe segment of the air-routing duct.

17. The dishwasher of claim 1, wherein the at least one blower generates the airflow, the at least one blower provided before the sorption unit of the sorption dryer device when viewed in the direction of the airflow.

18. The dishwasher of claim 17, wherein the at least one heating element is provided between the blower and the sorption unit with the reversibly dehydratable drying material of the sorption dryer device when viewed in the direction of the airflow.

19. The dishwasher of claim 18, wherein the at least one heating element is disposed in a casing of the sorption dryer device and, when viewed in the direction of the airflow, before the sorption unit of the sorption dryer device with the reversibly dehydratable drying material, and wherein the at least one heating element is a component of the sorption dryer device for desorption of the reversibly dehydratable drying material.

20. The dishwasher of claim 19, wherein the at least one heating element is underneath an intake cross-section area of the sorption unit within the casing of the sorption dryer device.

21. The dishwasher of claim 18, wherein the at least one flow-conditioning device is disposed between the blower and the at least one heating element when viewed in the direction of the airflow such that the airflow is generated with a same volumetric airflow essentially at every point of a flow surface of the at least one heating element.

22. The dishwasher of claim 21, wherein a flow velocity of the airflow is identical at every point of the flow surface of the at least one heating element.

23. The dishwasher as claimed in claim 21, further comprising a casing;
wherein the sorption dryer device is accommodated within the casing, and
wherein the at least one flow conditioning device for the at least one heating element is accommodated within the casing.

24. The dishwasher of claim 23, wherein the at least one flow conditioning device is accommodated underneath the at least one heating element.

25. The dishwasher of claim 18, wherein the at least one heating element has at least one heating rod or at least one wire coil.

26. The dishwasher of claim 25, the wire coil has an expanding geometric shape.

27. The dishwasher of claim 26, wherein the wire coil has a conical geometric shape.

28. The dishwasher of claim 25, further comprising:
a conical outer forced flow pipe that encapsulates one of the heating rod and the wire coil.

29. The dishwasher of claim 18, wherein the at least one flow-conditioning device includes the pipe wall, and
wherein the pipe wall is part of a pipe segment to guide the airflow, wherein the heating element is accommodated in the pipe segment.

30. The dishwasher of claim 29, wherein the pipe segment tapers with respect to a passage cross-section area of the pipe segment when viewed in the direction of the airflow.

31. The dishwasher of claim 29, wherein the plurality of apertures includes at least one air output opening in the pipe wall on at least one of an end and a top side of the pipe segment.

32. The dishwasher of claim 18, wherein the at least one flow-conditioning device includes the plate,
wherein the plate is one of perforated and slotted and is arranged in at least one positional plane at least one of above and below the heating element.

33. The dishwasher of claim 32, wherein at least one of a spacing of the plate from the heating element and a respective size of the plurality of apertures in the plate are configured such that the sorption unit of the sorption dryer device essentially receives an even incoming flow with respect to an intake cross-section area of the sorption dryer device.

34. The dishwasher of claim 18, further comprising fins on the heating element, the fins configured to at least one of condition the airflow and enlarge a surface of the heating element.

35. The dishwasher of claim 1, wherein the at least one flow-conditioning device is disposed between the at least one heating element and the sorption unit of the sorption dryer device when viewed in the direction of the airflow such that every point of an intake cross-section area of the sorption unit of the sorption dryer device is struck by and permeated by a same volumetric airflow.

36. The dishwasher of claim 1, wherein the at least one flow-conditioning device is disposed between the at least one heating element and the sorption unit of the sorption dryer device when viewed in the direction of the airflow such that every point of an intake cross-section area of the sorption unit of the sorption dryer device is permeated by a volumetric airflow with a same intake temperature.

37. The dishwasher of claim 1, wherein the at least one flow-conditioning device is disposed between the at least one heating element and the sorption unit of the sorption dryer device when viewed in the direction of the airflow such that every point of an intake cross-section area of the sorption unit of the sorption dryer device is permeated by a volumetric airflow with a same flow velocity.

38. The dishwasher of claim 1, wherein the at least one flow-conditioning device further comprises at least one flow-guiding device configured to deflect the airflow.

39. The dishwasher of claim 38, wherein the at least one flow-guiding device includes at least one guide plate configured to deflect the airflow.

40. The dishwasher of claim 1, wherein the at least one flow-conditioning device includes at least one of a perforated grating and a plate that is one of perforated and slotted.

41. The dishwasher of claim 40, wherein at least one of holes and slots in at least one of the perforated grating and the plate are of different sizes.

42. The dishwasher of claim 1, wherein the sorption unit has an air intake and an air output, and wherein the sorption unit is delimited by at least one screen of the plurality of screens at at least one of the air intake and the air output.

43. The dishwasher of claim 1, wherein screen apertures of the at least one screen are embodied to be of different sizes.

44. The dishwasher of claim 43, wherein the sorption unit has an essentially identical layer thickness when viewed across a passage area of the sorption unit for an inflowing airflow.

45. The dishwasher of claim 1, wherein the at least one plate, grating, or pipe wall includes one of a perforated or slotted plate, a perforated grating, and a perforated pipe wall, respectively.

46. The dishwasher of claim 1, wherein the plurality of apertures have different sizes configured to vary the airflow at the different portions of the at least one flow-conditioning device to thereby homogenize the flow cross-section profile of the airflow as the airflow flows into the sorption dryer device.

47. The dishwasher of claim 1, wherein the plurality of apertures have different shapes configured to vary the airflow at the different portions of the at least one flow-conditioning device to thereby homogenize the flow cross-section profile of the airflow as the airflow flows into the sorption dryer device.

48. The dishwasher of claim 1, wherein the plurality of apertures have different spacing therebetween configured to vary the airflow at the different portions of the at least one flow-conditioning device to thereby homogenize the flow cross-section profile of the airflow as the airflow flows into the sorption dryer device.

49. A dishwasher, comprising:

a washing container;

a sorption dryer device connected to the washing container in an air-conducting fashion, the sorption dryer device including at least one sorption unit with reversibly dehydratable drying material, and a plurality of screens or gratings in which the dehydratable drying material is interspaced;

at least one heating element;

at least one blower disposed upstream of the at least one heating element in a direction of flow, the direction of flow being that which an airflow flows from the washing container; and at least one flow-conditioning means for varying the airflow at different portions of a first flow cross-section profile of the airflow as the airflow flows from the at least one blower to thereby provide a homogenized second flow cross-section profile of the airflow as the airflow flows past the at least one flow-conditioning means into the sorption dryer device, wherein the at least one flow-conditioning means is disposed upstream of the sorption dryer device in the direction of flow and independent of the at least one heating element, and wherein the at least one flow-conditioning means is arranged at least one of between the at least one blower and the at least one heating element when viewed in the direction of the airflow and between the at least one heating element and the sorption dryer device when viewed in the direction of the airflow.

* * * * *